June 19, 1951  J. W. LITTLE  2,557,356
EVAPORATOR HAVING MEANS FOR REMOVING TUBES THEREFROM
Filed March 11, 1948  2 Sheets-Sheet 1
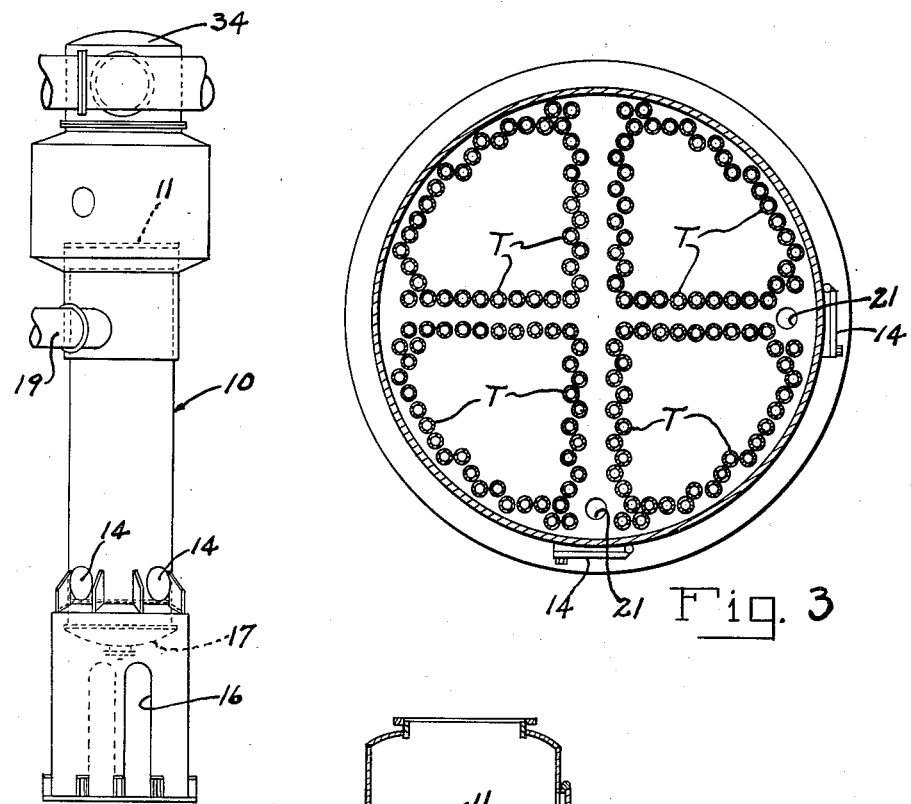
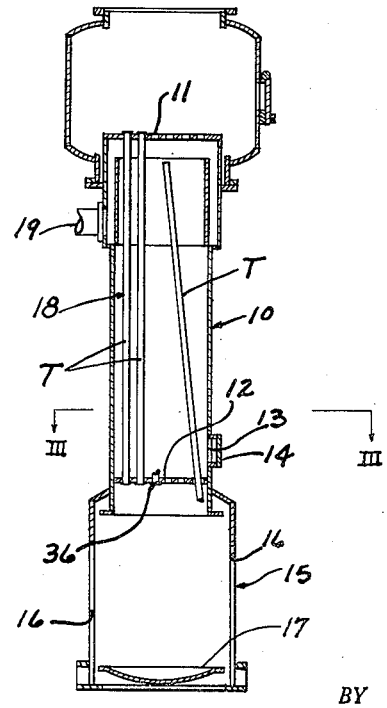
INVENTOR.
John W. Little
BY
Jennings & Carter
ATTORNEYS Patented June 19, 1951

2,557,356

UNITED STATES PATENT OFFICE 2,557,356

EVAPORATOR HAVING MEANS FOR REMOVING TUBES THEREFROM

John W. Little, Birmingham, Ala., assignor to Goslin-Birmingham Manufacturing Company, Inc., a corporation of Alabama Application March 11, 1948, Serial No. 14,188

3 Claims. (Cl. 257—224)

My present invention relates to an apparatus for removing worn or damaged tubes from an evaporator or the like preparatory to replacing the same with new tubes.

In the art to which my invention relates, the prior method of retubing an evaporator or similar piece of apparatus consisted in loosening the upper end of the tubes from the upper tube sheet and driving the tubes downwardly, one at a time, through the lower tube sheet. The holes in the tube sheet for receiving the tubes are only slightly larger in diameter than the tubes themselves, in most apparatus being about $\frac{1}{32}$ inch larger in diameter. After such apparatus has been in use for a length of time sufficient to require replacement of the tubes, it is found that each tube is encrusted on the outside with hard deposits of scale. The thickness and character of such encrustation is such as to considerably increase the diameter of the tube. In driving the tubes downwardly to remove the same as heretofore practiced, substantially the entire coating of scale had to be sheared off during the passage of the tube through its opening in the tube sheet. This operation is extremely laborious, expensive and time consuming, and sometimes results in major damage to the tube sheet.

It is the principal object of my invention, therefore, to overcome the above difficulties by providing one or more auxiliary openings in the lower tube sheet of a diameter to fully pass an encrusted tube, normally closed by a suitable removable cover, through which the tubes are passed after being cut adjacent the bottom end, and freed at the upper end from the upper tube sheet, thereby making it unnecessary to drive the encrusted tubes through the tube receiving openings of the lower tube sheet.

Another object of my invention is to provide a removable cover and holddown therefor especially adapted to form the closure for the tube openings in the tube sheet, and which shall be simple of construction and easily removed when it is desired to retube the evaporator.

Apparatus illustrating the features of my invention is shown in the accompanying drawings forming a part of this application in which:

Fig. 1 is an elevational view of one type of evaporator with which my improved tube removing means may be associated;

Fig. 2 is a somewhat diagrammatic vertical sectional view through the apparatus shown in Fig. 1, and illustrating a tube in the process of being removed through the lower tube sheet, the covers for the vapor head and the bottom being removed;

Fig. 3 is an enlarged sectional view taken along the line III—III of Fig. 2, only a few of the tubes being shown;

Figure 4:
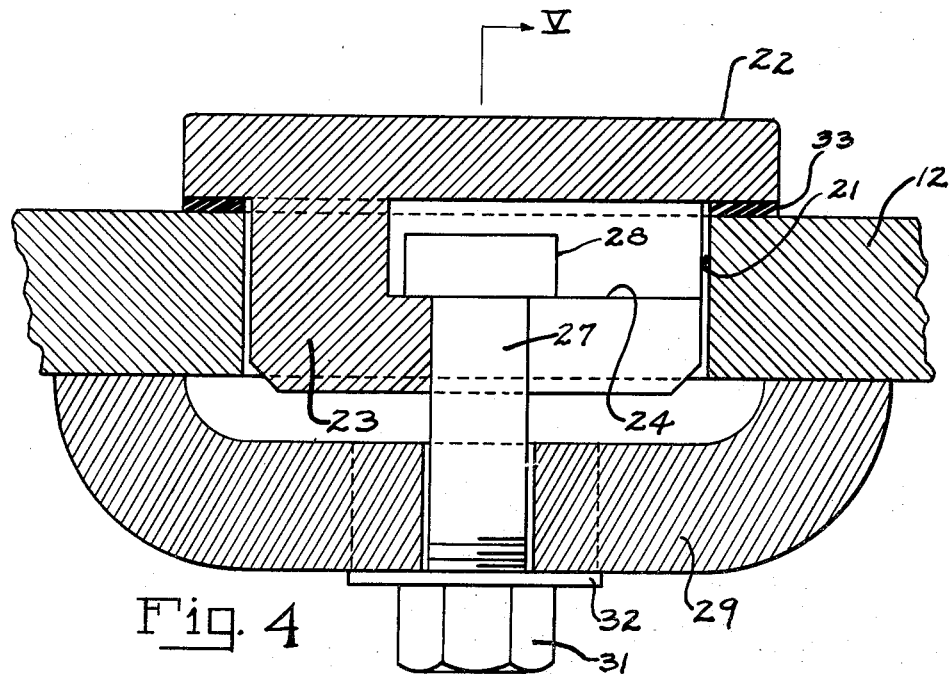
Fig. 4 is a sectional view drawn to an enlarged scale and illustrating the cover for one of the auxiliary openings in the lower tube sheet; and, Fig. 5 is a sectional view taken along line V—V of Fig. 4.

Referring now to the drawings for a better understanding of my invention, I illustrate the same in association with a well known type of vertical tube evaporator having a body 10, and upper and lower tube sheets 11 and 12. The body is provided with man holes 13 and covers 14 therefor through which a workman may enter the evaporator above the lower tube sheet 12. The evaporator may be supported with the lower tube sheet elevated a considerable distance above the floor line, the specific type of base 15 being shown, described, and claimed in an application filed in the names of John W. Little and Joseph H. Kelly on March 29, 1948, Serial No. 17,666. The base 15 is provided with a plurality of walk-in openings 16 whereby a workman may enter beneath the lower end of the evaporator. The bottom cover 17 for closing the lower end of the evaporator is shown in lowered position within the base 15.

As understood, the evaporator also comprises a tube nest 18 embodying a multiplicity of individual tubes T disposed between the upper and lower tube sheets. The tubes are expanded into the openings of the upper tube sheet 11 and similarly expanded into the openings of the lower tube sheet 12. The tubes are thus made fluid tight with respect to the tube sheets, and steam is admitted through a suitable conduit 19.

Figure 5:
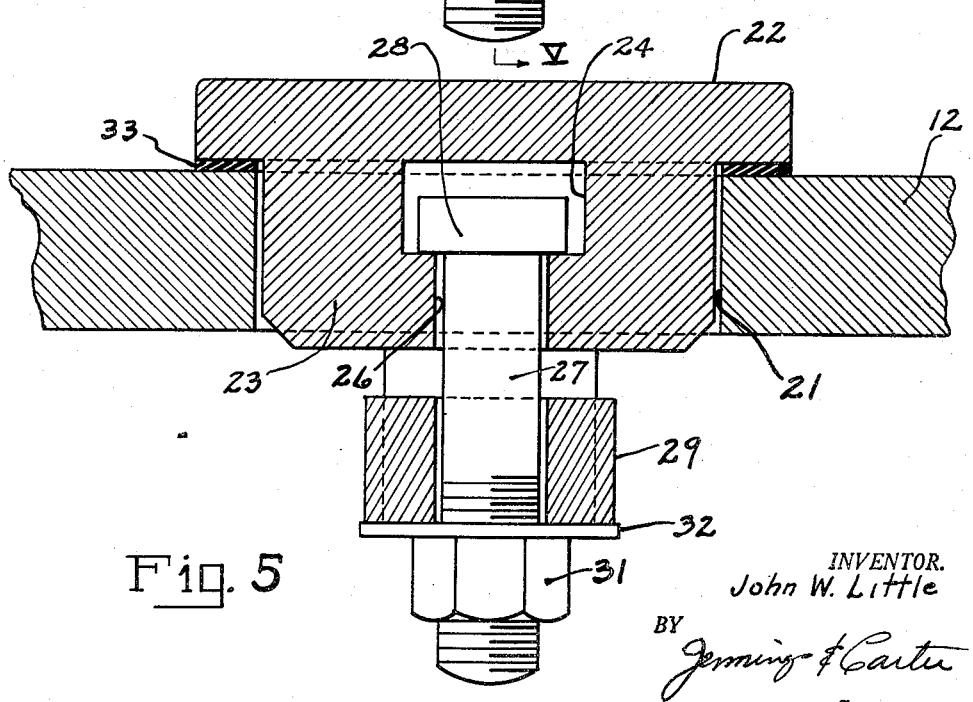

Directly in front of each of the man holes 13 I provide in the periphery of the lower tube sheet 12 an opening 21. These openings preferably are of a size to freely pass an encrusted tube, and in normal operation of the evaporator are closed by means of a cover 22. As best shown in Figs. 4 and 5, the covers 22 carry an integrally formed depending portion 23. The depending portion 23 is provided with an elongated slot 24, having its bottom notched out as indicated at 26. A bolt 27 is slidably received in the notch 26, the head 28 thereof engaging the shoulders at the bottom of the opening 24. The threaded end of the bolt 27 passes through a yoke 29 disposed to contact the lower surface of the tube sheet 12 and is held in place thereagainst by means of a nut 31 and washer 32. A gasket 33 is interposed between the cover 22 and the tube sheet 12 whereby when the nut is tightened about the bolt 27 the opening 21 is effectively sealed.

From the foregoing the method of retubing an evaporator or the like embodying my improved arrangement may now be described and readily understood. The cover 34 over the vapor head at the top of the body 10 and the lower cover 17 are removed in order to permit a workman to enter above the upper tube sheet 11 and to permit the tubes to be dropped downwardly through the bottom opening as will be explained. The manholes 13 are opened and nuts 31 on the bolts 27 are removed thereby to drop the yokes 29 and permit the covers 22 to be pushed upwardly from the bottom where they may be removed through the manholes 13. An operator, working through the manholes 13 with a suitable tool, cuts the tubes closest the openings 21. A workman at the top of the body, above the upper tube sheet 11 and using a suitable tool, loosens the upper ends of the tubes from the upper tube sheet. As soon as a tube is loosened from the upper tube sheet 11, the workman at manhole 13 pulls the free end of the tube over and down into the opening 21 as shown diagrammatically in Fig. 2 of the drawing. The tube falls by gravity until its lower end strikes the floor on which the evaporator rests, whereupon a workman cuts a section from the end of the tube, projecting beneath the lower tube sheet. The section thus cut is discarded through the opening 16 and this operation is repeated until the entire tube is cut up into short lengths and removed from the evaporator. This process is continued until all of the tubes are removed, it being understood that the stub ends 36 left in the lower tube sheet are removed by drawing the same upwardly or downwardly. The new tubes may now be placed in the evaporator from the top thereof through the vapor head opening and secured both to the upper and lower tube sheets.

As stated, the openings 21 are of a diameter to pass an encrusted tube without the necessity of forcing the same therethrough. While the diameter of the openings 21 will vary for different apparatus, I have found that for an evaporator having 2 inch diameter tubes, openings of 3⅝ inches in diameter are quite satisfactory.

Likewise, while I show and describe an opening 21 disposed directly inward from each manhole 13, it will be apparent that only one such opening would suffice since the lower ends of the tubes may be moved about when the upper ends thereof are freed from the upper tube sheet.

From the foregoing it will be apparent that I have devised an improved arrangement adapted for association with an evaporator or the like by means of which the tubes thereof may be readily and easily removed. It is apparent that the method of cutting the tubes adjacent the lower ends thereof, passing them through the lower tube sheet, and cutting the same into short lengths provides a simple and effective way of removing the tubes without shearing the layer of scale along the entire length thereof as has heretofore been the practice.

The particular style of cover shown in Figs. 4 and 5 of the drawings and the hold down means therefor make it possible to place the cover on the top of the lower tube sheet 12 whereby the pressure within the evaporator aids in sealing the opening 21. It will be apparent that an evaporator embodying my improved tube removing means may be quickly retubed, thus to put the same back into operation within a minimum of time.

While I have shown and described my improved arrangement in association with a vertically disposed evaporator, it may be employed with evaporators of other types. Likewise, while I have stated that the openings 21 are provided in the lower tube sheet, in some types of evaporators it will be found expedient and more practical to provide them in the upper tube sheet, and in some horizontal evaporators, in either of the tube sheets. In some units such as horizontal tube condensers or in vertical evaporators, boilers, or condensers it is not necessary to cut the tubes into short lengths after they are passed through the tube sheet, since some such units are so disposed as to provide space for withdrawing the entire length of the tube.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In an evaporator embodying a body having spaced tube sheets therein and a plurality of tubes connected directly at their ends to the tube sheets, the combination of a man hole providing an entrance way into the body of the evaporator between the tube sheets, an opening in one of the tube sheets adjacent the periphery thereof of a size to freely pass an encrusted tube and disposed adjacent the manhole, and a removable closure for said opening.

2. In an evaporator embodying a body having upper and lower tube sheets with a plurality of tubes connected directly at each end to the tube sheets, a manhole providing an entrance way into a side of the body below the upper tube sheet and immediately adjacent the lower tube sheet, an opening in the lower tube sheet of a size to freely pass an encrusted tube and disposed at the periphery of the lower tube sheet adjacent the manhole, said opening being normally unoccupied by a tube, and a removable cover for said opening accessible for removal through said manhole.

3. In an evaporator embodying a body with spaced tube sheets therein and a plurality of tubes connected at the ends directly to the tube sheets, the combination of an opening adjacent the periphery in one of the tube sheets of a size to freely pass an encrusted tube and normally unoccupied by a tube, a removable closure for said opening, and means giving access to the interior of the evaporator adjacent said opening for removal of a tube therefrom.

JOHN W. LITTLE.

REFERENCES CITED

The following references are of record in the file of this patent:

UNITED STATES PATENTS

| Number | Name | Date |
|---|---|---|
| 1,631,162 | Sebald | June 7, 1927 |
| 2,196,683 | Pickstone | Apr. 9, 1940 |
| 2,200,528 | Armstrong | May 14, 1940 |
| 2,394,831 | Woods | Feb. 12, 1946 |
| 2,411,246 | Clapper | Nov. 19, 1946 |

FOREIGN PATENTS

| Number | Country | Date |
|---|---|---|
| 1,563 of 1891 | Great Britain | Jan. 28, 1891 |